United States Patent
Gagliardi, Jr.

(10) Patent No.: US 6,939,217 B2
(45) Date of Patent: Sep. 6, 2005

(54) METHOD OF PREPARING A BIRD FOR GRILLING AND RESULTING BIRD PRODUCT

(75) Inventor: Eugene D. Gagliardi, Jr., Atglen, PA (US)

(73) Assignee: Skippack Creek Corporation, Wilmington, DE (US)

( * ) Notice: Subject to any disclaimer, the term of this patent is extended or adjusted under 35 U.S.C. 154(b) by 0 days.

(21) Appl. No.: 10/985,215

(22) Filed: Nov. 10, 2004

(65) Prior Publication Data

US 2005/0124277 A1    Jun. 9, 2005

Related U.S. Application Data

(60) Provisional application No. 60/519,850, filed on Nov. 13, 2003.

(51) Int. Cl.⁷ ............................................. A22C 21/00
(52) U.S. Cl. ...................................................... 452/149
(58) Field of Search ............................... 452/149, 150, 452/198, 153, 155, 160, 163, 164, 106, 132, 452/135–137; 426/644, 134, 646, 578

(56) References Cited

U.S. PATENT DOCUMENTS

| | | | |
|---|---|---|---|
| 2,594,189 A | * | 4/1952 | MacFarland .................. 15/400 |
| 3,644,125 A | * | 2/1972 | Lobiondo et al. ........... 426/480 |
| 4,849,245 A | * | 7/1989 | Galbraith ..................... 426/644 |
| 5,368,519 A | * | 11/1994 | Curtis et al. ................ 452/135 |
| 5,667,436 A | * | 9/1997 | Gagliardi, Jr. .............. 452/149 |
| 5,779,532 A | * | 7/1998 | Gagliardi, Jr. .............. 452/149 |
| 6,280,311 B1 | * | 8/2001 | Kuck .......................... 452/135 |
| 6,572,467 B1 | * | 6/2003 | Hirokane .................... 452/135 |

* cited by examiner

Primary Examiner—Thomas Price
(74) Attorney, Agent, or Firm—Akin Gump Strauss Hauer & Feld, LLP

(57) ABSTRACT

A method for preparing a whole bird for grilling comprises removing the tips from each of the wings of the bird and cutting a notch into each of the joints of each of the wings of the bird. The backbone and attached neck are removed from the bird by cutting along both sides of the backbone where the backbone meets the ribs of the bird. Excess skin and fat are removed from the bird proximate the thighs and the skin is removed from the bird around the breasts so that the whole bird is separated into two relatively flat halves. A notch is cut into the knee joint between each of the drumsticks and thighs of the bird and each of the thighs is partially separated from the rest of the body of the bird at the hip joint.

8 Claims, 9 Drawing Sheets

# METHOD OF PREPARING A BIRD FOR GRILLING AND RESULTING BIRD PRODUCT

CROSS-REFERENCE TO RELATED APPLICATIONS

This Patent Application claims the priority of U.S. Provisional Patent Application No. 60/519,850 filed Nov. 13, 2003 and entitled "Method of Cutting a Bird for Grilling and Resulting Bird Product", the entire subject matter of which is hereby incorporated herein by reference.

BACKGROUND OF THE INVENTION

The present invention relates generally to birds, such as chickens and other poultry or fowl and the like, and, more particularly, to a method of preparing a bird to make the bird more suitable for grilling and a bird product resulting from the use of the method.

Birds, such as poultry and fowl, are conventionally eviscerated, dressed and sold either as a whole bird or separate parts, i.e., breasts, thighs, drumsticks, wings, etc. Typically, whole birds are sold with the skin in place and with the wings, legs and other meat still attached to the bones. In recent years, there has been an increasing demand for innovative meat products, particularly products which require less time for preparation and which include little or no waste. Additionally, there has been an increasing demand for meat products which are suitable for preparation on a grill such as an indoor or outdoor gas or electric grill, charcoal grill or the like. Typically, whole birds have not been readily susceptible to grilling because of their irregular size and shape which generally results in some parts of the bird being overcooked while other parts of the bird, particularly at or near the leg and wing joints, are undercooked.

The present invention comprises a method of cutting and preparing a substantially whole bird to make the bird more suitable for grilling on a gas or electric grill, charcoal grill or the like. Utilizing the method of the present invention a substantially whole bird may be grilled such that all of the meat portions of the bird are fully and properly cooked within approximately the same cooking time so that no parts of the bird are overcooked or undercooked.

BRIEF SUMMARY OF THE INVENTION

Briefly stated, the present invention comprises a method of preparing a whole bird for grilling. The method comprises the steps of: removing the tips from each of the wings of the bird; cutting a notch into each of the joints of each of the wings of the bird; removing the backbone and attached neck of the bird by cutting along both sides of the backbone where the backbone meets the ribs of the bird; removing excess skin and fat from the bird proximate the thighs and removing the skin from around the breasts so that the whole bird is separated into two relatively flat halves; cutting a notch in the knee joint between each of the drumsticks and thighs of the bird; and opening up and partially separating each of the thighs from the rest of the body of the bird at the hip joint.

In another embodiment, the present invention comprises a bird prepared for grilling in accordance with the method described above.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention comprises a method for preparing a bird for grilling on a gas, electric, charcoal or other grill. The bird as illustrated in the attached figures and described below is a whole chicken 10. It should be clearly understood by those of ordinary skill in the art that the present invention is not limited to cutting and preparing a chicken but is equally applicable to any other type of bird, poultry or fowl such as a turkey, duck, goose, game hen, etc.

Figure 1:
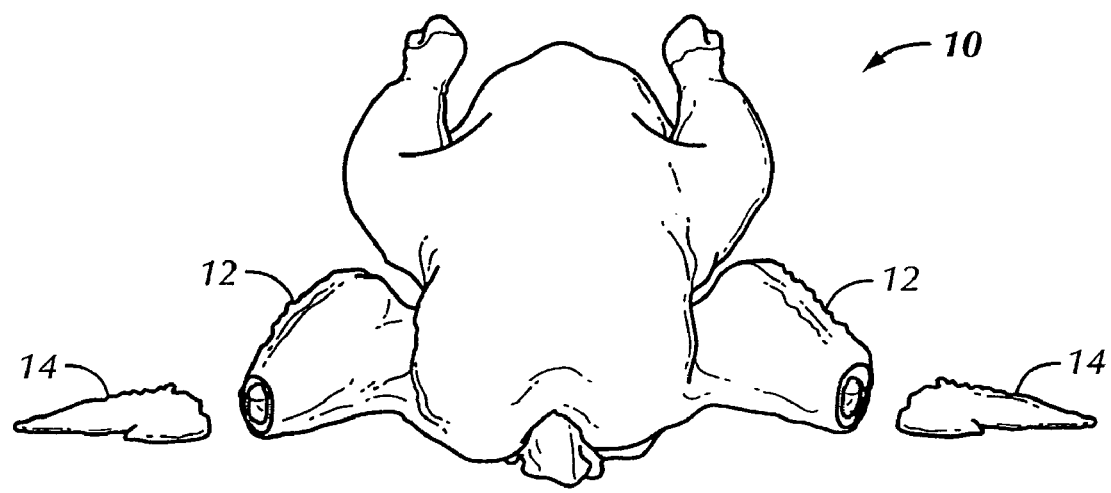
FIG. 1 is a top perspective view of a whole chicken illustrating the first step of a preferred method in accordance with the present invention.

FIG. 1 illustrates the first step of the preferred method of cutting and preparing a whole chicken 10 in accordance with the present invention. The whole chicken 10 as illustrated in FIG. 1 is typical of a chicken which might be purchased from a supermarket, butcher, etc. As illustrated in FIG. 1, the first step of the preferred method is to cut and remove the tips 14 from both of the chicken wings 12. The wings 12 may be extended outwardly from the rest of the chicken 10 as shown to facilitate removal of the wing tips 14. Each of the cutting steps of the present method may be accomplished utilizing a knife, saw, water knife or the like or any other known instrument suitable for cutting a chicken or other meat. Once removed, the wing tips 14 may be disposed of or may be used for feed or in some other product.

Figure 2:
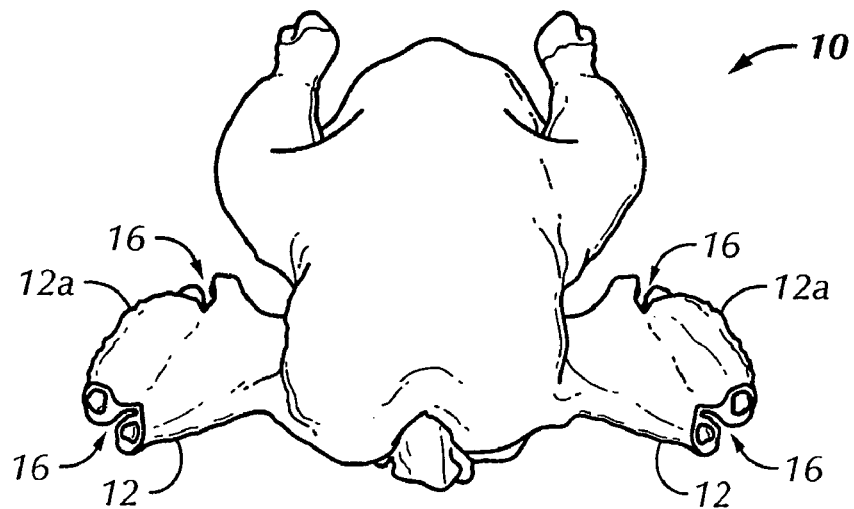
FIG. 2 is a top perspective view of the chicken shown in FIG. 1 illustrating the second step of a preferred method of the present invention.

FIG. 2 illustrates the second step of the preferred method for cutting and preparing the chicken 10 for grilling in accordance with the present invention. The second step involves nicking or cutting a small, generally V-shaped notch or groove 16 into each of the ends of the flat parts 12a of the remaining portions of both of the wings 12. The purpose in nicking or cutting the notch or groove into the wing joints is to permit heat from the grill to more thoroughly enter the area around the joint and to cook the meat around and close to the wing joints.

Figure 3:
FIG. 3 is a bottom perspective view of the chicken shown in FIG. 1 illustrating a third step of a preferred method in accordance with the present invention.

FIG. 3 illustrates a third step in accordance with the preferred method for cutting and preparing the chicken 10 for grilling in accordance with the present invention. In the third step, the neck and backbone 18 of the chicken 10 are removed by cutting down both sides of the backbone 18 where the backbone 18 meets the ribs. The backbone 18 and the attached neck is removed from the rest of the chicken 10 and disposed of or is used for feed or for some other purpose. Cutting the backbone 18 for removal from the remainder of the chicken 10 is well-known to those of ordinary skill in the meat cutting art. Removing the backbone 18 in this manner permits the chicken 10 to assume a more flattened condition (FIG. 4) to provide a more even exposure of the chicken 10 to the heat of a grill, particularly in the area of the ribs.

Figure 4:
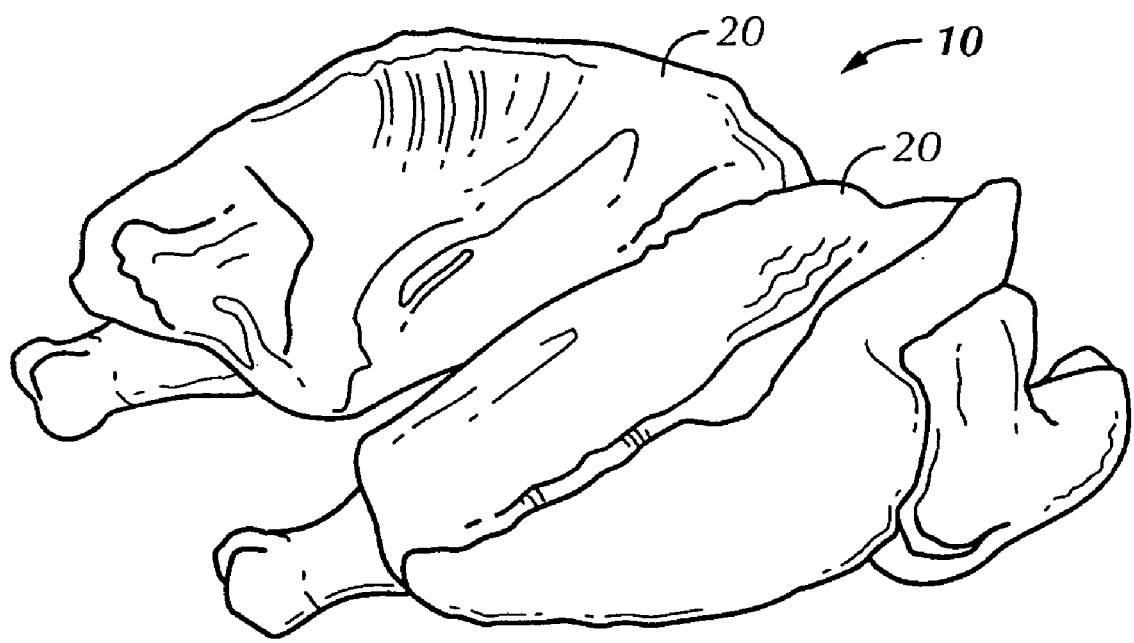
FIG. 4 is a bottom perspective view of the chicken shown in FIG. 1 separated into two halves and illustrating a fourth step of the preferred method in accordance with the present invention.

FIG. 4 illustrates the fourth step of the preferred method for cutting and preparing the chicken 10 for grilling in accordance with the present invention. The fourth step involves removing the keel bone (not shown) from the area between the two chicken breasts 20. The keel bone is removed in a manner well-known to those of ordinary skill in the art by pushing outwardly on the keel bone from the top side of the chicken 10 and then grasping the keel bone from the bottom side of the chicken 10 and pulling it out from between the two breasts 20. Removing the keel bone allows the chicken 10 to assume a flatter posture to facilitate more even heating on a grill particularly of the breasts 20 and allows heat from the grill to enter the area from which the keel bone has been removed for more even cooking of the surrounding breast meat.

Figure 5:
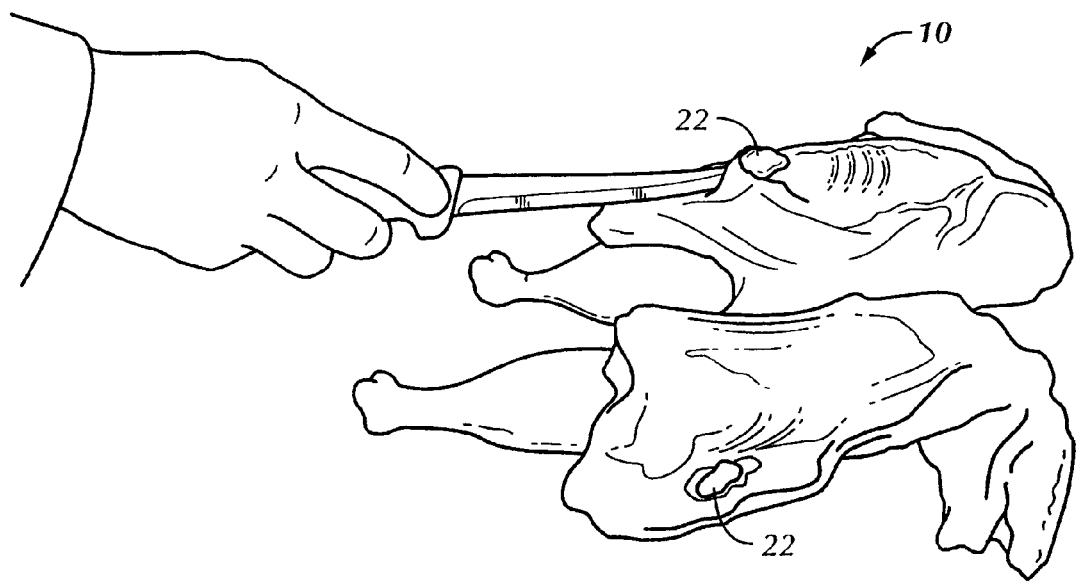
FIG. 5 is a view similar to FIG. 4 illustrating a fifth step of the preferred method in accordance with the present invention.

FIG. 5 illustrates the fifth step of the preferred method for cutting and preparing the chicken 10 for grilling in accordance with the present invention. The fifth step involves removing the kidneys 22 and any other organs which may be present within the interior of the chicken 10.

Figure 6:
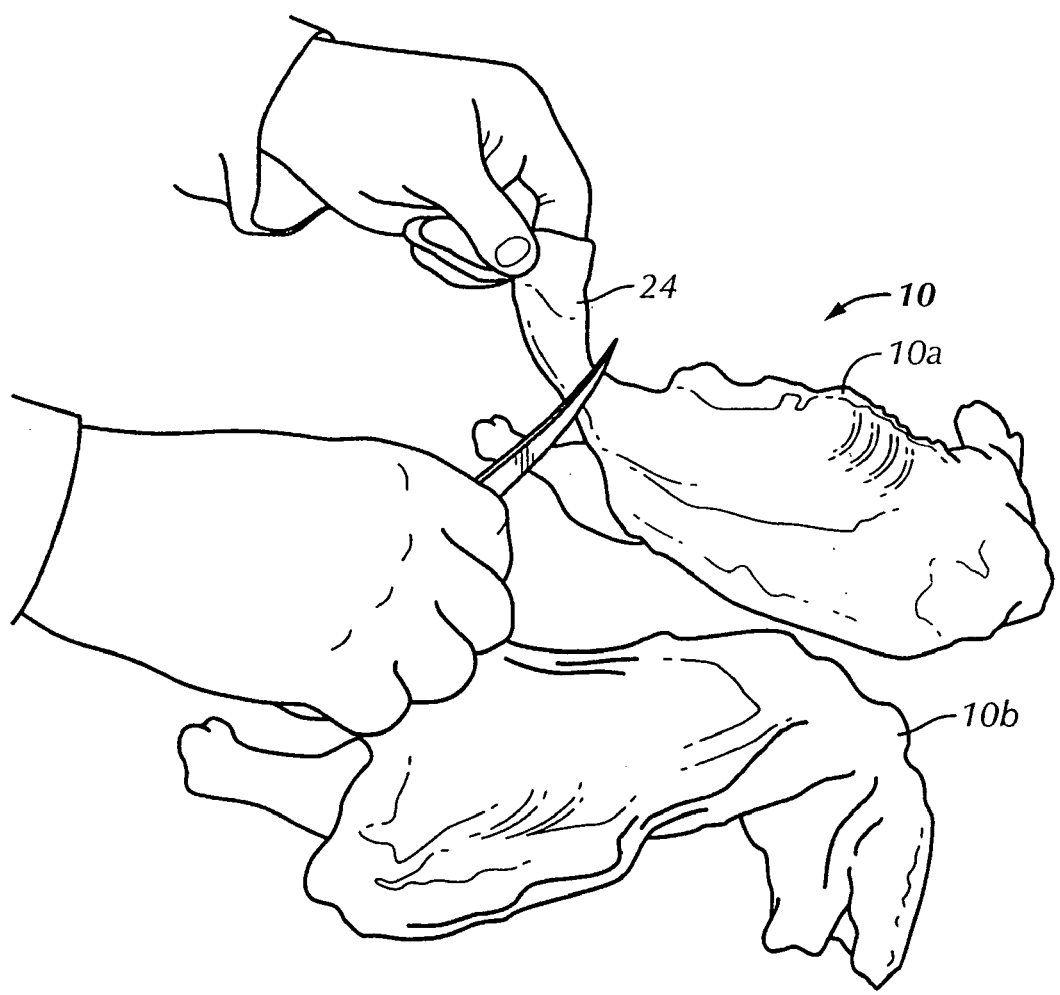
FIG. 6 is a view similar to FIG. 4 illustrating a sixth step of a preferred method in accordance with the present invention.

FIG. 6 illustrates the sixth step of the preferred method for cutting and preparing the chicken 10 for grilling in accordance with the present invention. In the sixth step, excess skin and fat 24 are cut away from various portions of the chicken 10 particularly in the area of the thighs 30 and between the two breasts 20. The tailbone (not shown) is also removed and disposed of. Removing the excess skin eliminates some portions of the chicken 10 which need not be cooked and also results in the remainder of the whole chicken 10 being separated into two chicken halves 10a and 10b. The removal of the excess skin and other undesirable components and the separating of the chicken 10 into two halves 10a and 10b allows the chicken 10 to be more flattened and therefore to be more evenly exposed to the heat of a grill to provide for a more even cooking.

Figure 7:
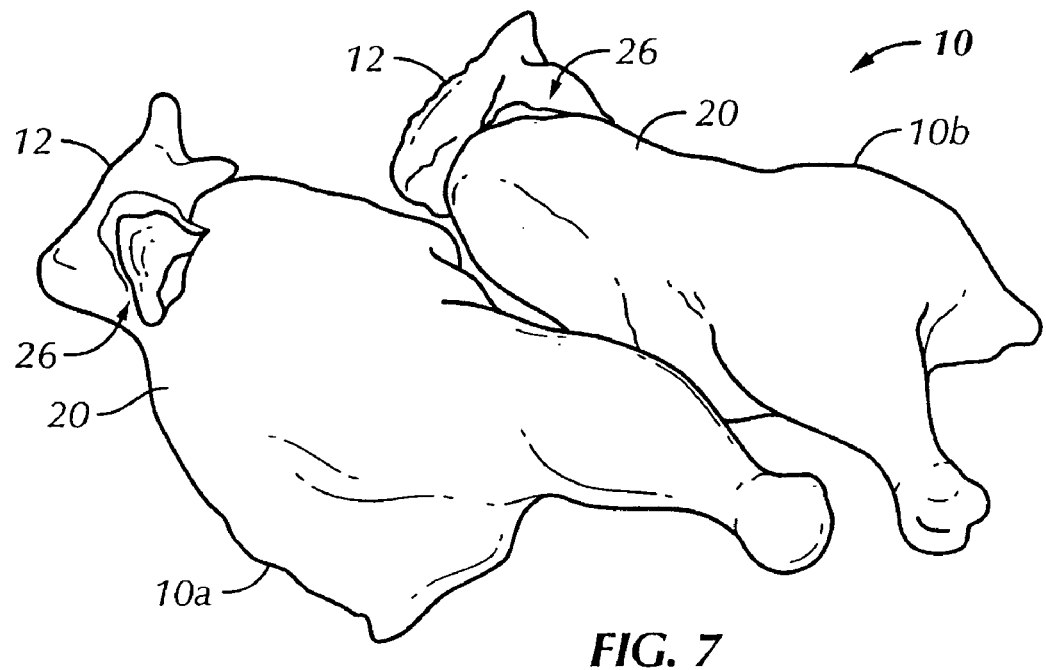
FIG. 7 is a top perspective view of the two chicken halves shown in FIG. 6 illustrating a seventh step of a preferred method in accordance with the present invention.

FIG. 7 illustrates the seventh step of the preferred method for cutting and preparing the chicken 10 for grilling in accordance with the present invention. As shown in FIG. 7, the joint between the proximal ends of each of the wings 12 and the breasts 20 are partially pulled apart and separated as illustrated by arrow 26 to permit heat from the grill to enter the area proximate the wing/breast joint for more thorough cooking of the meat near this area of the chicken. If desired, the joint between the proximal ends of each of the wings 12 and the breasts 20 may be nicked or notched to facilitate the separating step.

Figure 8:
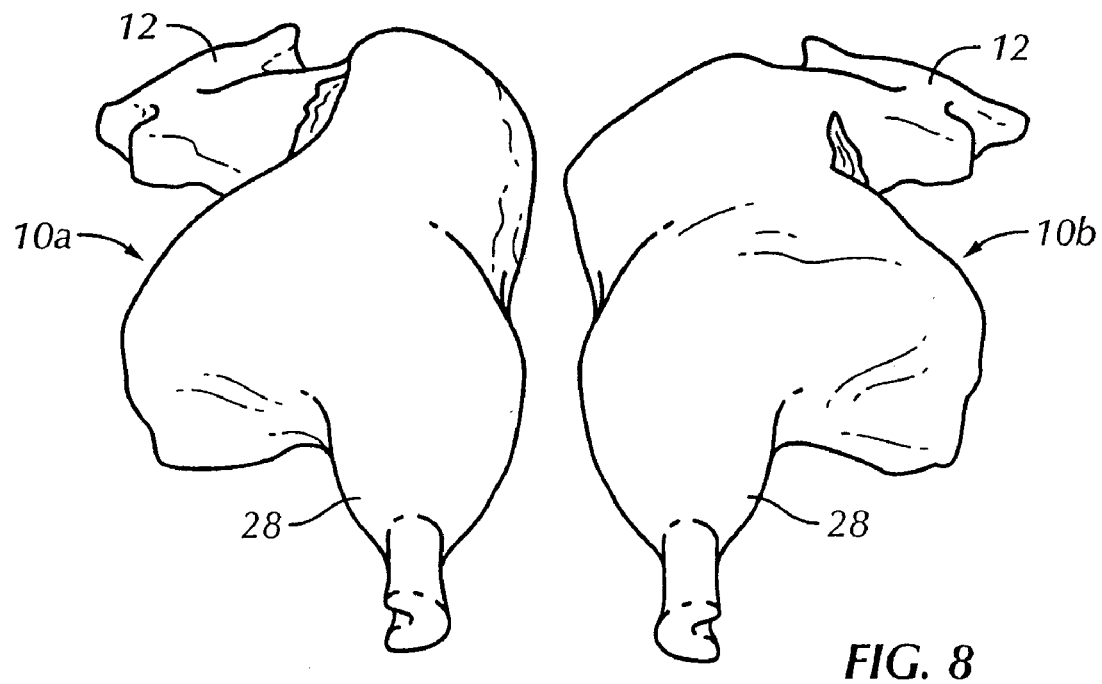
FIG. 8 is a view similar to FIG. 7 showing an eighth step of a preferred method in accordance with the present invention.

FIG. 8 illustrates the eighth step of the preferred method for cutting and preparing the chicken 10 for grilling in accordance with the present invention. As illustrated in FIG. 8, each of the distal ends of each of the drumsticks 28 is "frenched" by cutting through the bone and removing the snakeskin and ankle joint, both of which are discarded. Frenching the drumstick 28 in this manner provides for more even heating of the chicken halves 10a and 10b.

Figure 9:
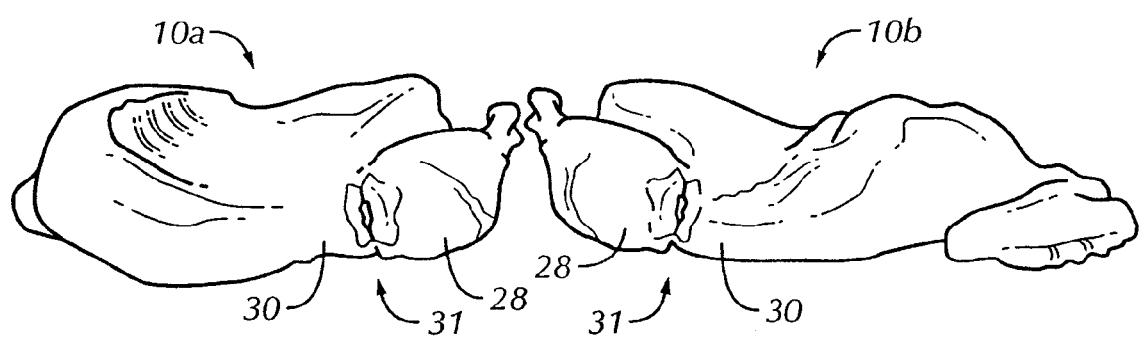
FIG. 9 is a view similar to FIG. 6 showing a ninth step of a preferred method in accordance with the present invention.

FIG. 9 illustrates the ninth step of the preferred method for cutting and preparing the chicken 10 for grilling in accordance with the present invention. In the ninth step, each of the drumsticks 28 are partially separated from the thighs 30 at the knee joint by nicking or cutting a small V-shaped notch 31 into the knee joint area. The purpose of partially separating the drumsticks 28 from the thighs 30 in this manner is to permit heat from the grill to more easily enter the area of the knee joint for more even and complete cooking of the surrounding meat. Typically, when cooking a whole chicken, the knee joint is one of the last areas to be fully cooked.

Figure 10:
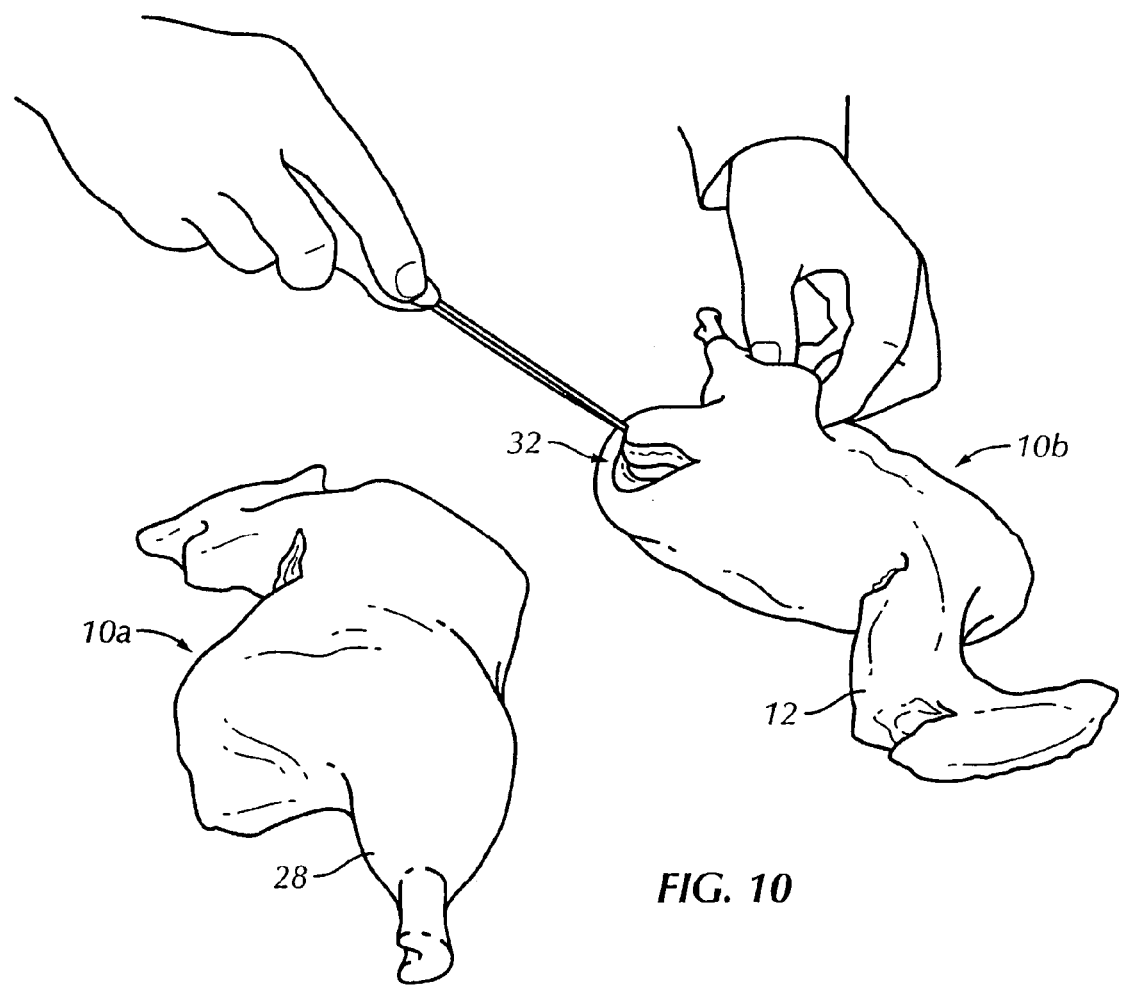
FIG. 10 is a perspective view of the chicken halves similar to FIG. 8 showing a tenth step of a preferred method in accordance with the present invention.

FIG. 10 illustrates the tenth step of the preferred method for cutting and preparing the chicken 10 for grilling in accordance with the present invention. As illustrated in FIG. 10, each of the hip joints between the thighs 30 and the remainder of the chicken halves 10a and 10b are partially separated as illustrated by arrows 32 by nicking or cutting a notch in the hip joint area. Again, the purpose in partially separating the thighs 30 from the remainder of the chicken halves 10a and 10b and opening up the hip joints is to permit heat from the grill to enter the area of the hip joints to more thoroughly cook the meat surrounding this area of the chicken 10.

Figure 11:
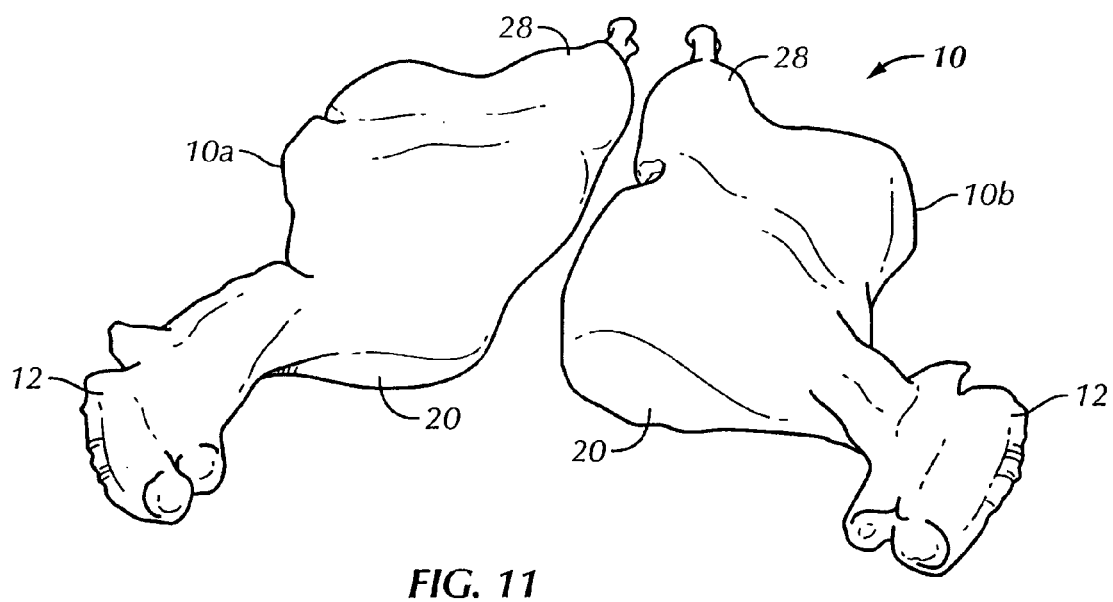
FIG. 11 is a top perspective view of the chicken halves which have been cut and prepared in accordance with the preferred method of the present invention and are ready to be placed on a grill for cooking.

FIG. 11 illustrates the chicken 10 which is now ready for grilling. The chicken, particularly the two chicken halves 10a and 10b may be laid generally flat on the grates of a grill for cooking. As described above, all of the leg and wing joints have been partially severed or separated in order to allow heat from the grill to more easily enter and thoroughly cook the meat near the joint areas. Because the backbone 18 and keel bone and most of the excess fat and skin have been removed, the chicken halves 10a and 10b may be completely grilled on medium high heat for approximately 20–25 minutes on each side. If desired, the chicken halves 10a and 10b may be coated with a sauce or a dry barbecue or other rub or may be marinated prior to cooking. The general flatness of the chicken halves 10a and 10b and the openness of the various joints permits the chicken halves 10a and 10b to cook in a more even and complete manner. Because all of the joints have been at least partially separated, the wings 12, drumsticks 28 and thighs 30 are more easily pulled apart from the remainder of the chicken halves 10a and 10b once grilling has been completed. The removal of the keel bone and the backbone 18 permit easy carving of the remaining breast meat.

It will be appreciated by those skilled in the art that changes could be made to the embodiment described above without departing from the broad inventive concepts thereof. For example, in some applications it may be desirable to completely remove the wings and/or the legs prior to grilling. It is understood, therefore, that this invention is not limited to the particular embodiments disclosed, but is intended to cover all modifications within the spirit and scope of the present invention as defined by the appended claims.

I claim:

1. A method of preparing a whole bird for grilling comprising the steps of:
   (a) removing the tips from each of the wings of the bird;
   (b) cutting a notch into each of the joints of each of the wings of the bird;
   (c) removing the backbone and attached neck of the bird by cutting along both sides of the backbone where the backbone meets the ribs of the bird;
   (d) removing excess skin and fat from the bird proximate the thighs and removing the skin from around the breasts so that the whole bird is separated into two relatively flat halves;
   (e) cutting a notch in the knee joint between each of the drumsticks and thighs of the bird; and
   (f) opening up and partially separating each of the thighs from the rest of the body of the bird at the hip joint.

2. The method as recited in claim 1 further comprising the step of removing the snakeskin and ankle from each of the drumsticks of the bird.

3. The method as recited in claim 1 further comprising the step of removing the keel bone from the area between the breasts of the bird.

4. The method as recited in claim 1 further comprising removing any organs present within the interior of the bird.

5. The method as recited in claim 1 further comprising the step of coating the bird halves with one of a marinade, a sauce and a rub.

6. The method as recited in claim 1 further comprising the step of placing the bird halves flat on a grill and cooking the bird halves for 20–25 minutes on each side.

7. The method as recited in claim 1 wherein the bird comprises one of a chicken, a turkey, a duck, a goose and a game hen.

8. A bird prepared for grilling in accordance with the method recited in claim 1.

* * * * *